(12) United States Patent
Brunone

(10) Patent No.: US 7,530,451 B2
(45) Date of Patent: May 12, 2009

(54) SUPPORT STATION OF CONVEYOR BELT AND TRANSPORTER COMPRISING SAME

(76) Inventor: René Brunone, 46, Rue du Général Leclerc, Saint-Marcel (FR) F-27950

( * ) Notice: Subject to any disclaimer, the term of this patent is extended or adjusted under 35 U.S.C. 154(b) by 0 days.

(21) Appl. No.: 11/662,920

(22) PCT Filed: Sep. 27, 2005

(86) PCT No.: PCT/FR2005/002393

§ 371 (c)(1),
(2), (4) Date: Jul. 12, 2007

(87) PCT Pub. No.: WO2006/037873

PCT Pub. Date: Apr. 13, 2006

(65) Prior Publication Data

US 2008/0078655 A1 Apr. 3, 2008

(30) Foreign Application Priority Data

Oct. 6, 2004 (FR) .................................. 04 10546

(51) Int. Cl.
*B65G 15/08* (2006.01)
(52) U.S. Cl. .................. 198/828; 198/818; 198/830
(58) Field of Classification Search .......... 198/818–830
See application file for complete search history.

(56) References Cited

U.S. PATENT DOCUMENTS 4,524,864 A * 6/1985 Peterson, II ............... 198/828
6,079,551 A * 6/2000 Horak ....................... 198/819

FOREIGN PATENT DOCUMENTS

DE 28 00728 7/1979

* cited by examiner

*Primary Examiner*—James R Bidwell
(74) *Attorney, Agent, or Firm*—Young & Thompson

(57) ABSTRACT

The invention concerns a support station (12) of a conveyor belt comprising a base (20) supported on the floor and a cradle (22) guiding the belt (14) supported by the base. The base (20) comprises at least one concrete beam (30). The invention is applicable to a conveyor belt.

8 Claims, 2 Drawing Sheets

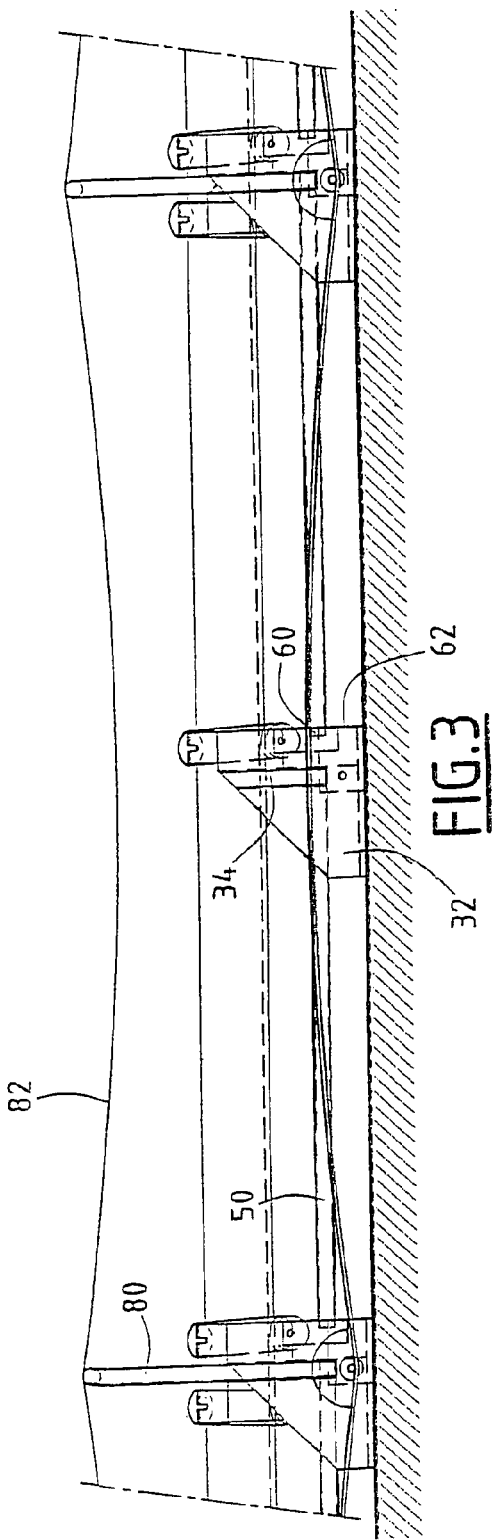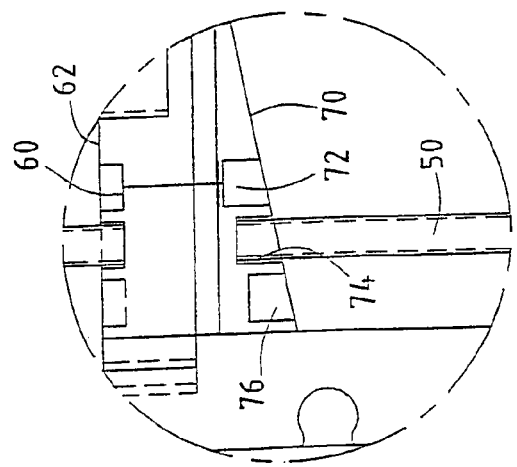

SUPPORT STATION OF CONVEYOR BELT AND TRANSPORTER COMPRISING SAME

The present invention relates to a conveyor belt support station of the type comprising a base for bearing against the ground and a cradle for guiding the belt and supported by the base.

In order to transport aggregates coming from mines or quarries, or indeed in order to transport foodstuffs, in particular cereals or any other bulk produce, it is known to use conveyor belts that are constituted by a set of support stations placed on the ground and distributed along the length of the conveyor. A belt forming a closed loop is supported by the stations. The belt travels over the stations in a closed circuit, being held at its two ends by two reversing rollers. The support stations are distributed along a transport go segment and a belt return segment, these two segments generally extending parallel to each other.

For conveyors that are installed on a temporary basis, or that need to be moved, it is known for each support station to be constituted by a respective base suitable for bearing on the ground and a belt support cradle resting on the base and being generally trough-shaped. By way of example, the cradle comprises one or more rollers for guiding and supporting the belt.

In order to reduce the costs of support stations, the base and the support cradle are generally constituted by metal tubes that are welded to one another.

Such cradles are relatively light in weight and they therefore need to be held stationary relative to the ground in order to avoid the conveyor moving while the belt is moving, or during difficult weather conditions. Thus, for example, it is possible to anchor the support stations using metal rods thrust into the ground, or else to ballast the support stations with ballast weights placed on the base of each station.

Those methods of preventing the stations from moving relative to the ground consume time and are found to be difficult to implement by people operating the conveyor. As a result, they increase considerably the cost of running the conveyor, even if the stations themselves are initially of moderate price.

An object of the invention is to propose conveyor belt support stations and a conveyor including them that enable the conveyor to be operated at moderate cost.

To this end, the invention provides a support station of the above-specified type, characterized in that the base comprises at least one concrete beam.

In particular embodiments, the support station includes one or more of the following characteristics:

the base comprises a transverse concrete beam extended at each end by a respective side arm extending generally transversely to the main beam;

the base comprises a transverse main beam of concrete extended at each end by a respective concrete column for supporting the belt-guide cradle;

the belt-guide cradle includes tabs embedded directly in the concrete of the base; and the base includes sets of blind holes laterally on either side, the holes opening out laterally and having ends that extend to different levels along the longitudinal axis of the station.

The invention also provides a conveyor comprising a set of support stations disposed in succession and a conveyor belt forming a closed loop and suitable for traveling over the support stations, the conveyor being characterized in that at least some of the support stations are stations as described above.

In a particular embodiment, the conveyor comprises stations as described above together with spacers interposed between two successive support stations and suitable for being engaged selectively in one or the other of the blind holes whose ends extend to different levels.

The invention can be better understood on reading the following description given purely by way of example and made with reference to the accompanying drawings, in which:

FIG. 3 is a fragmentary side view of the FIG. 1 conveyor; and

FIG. 4 is a plan view showing a detail of FIG. 1.

Figure 1:
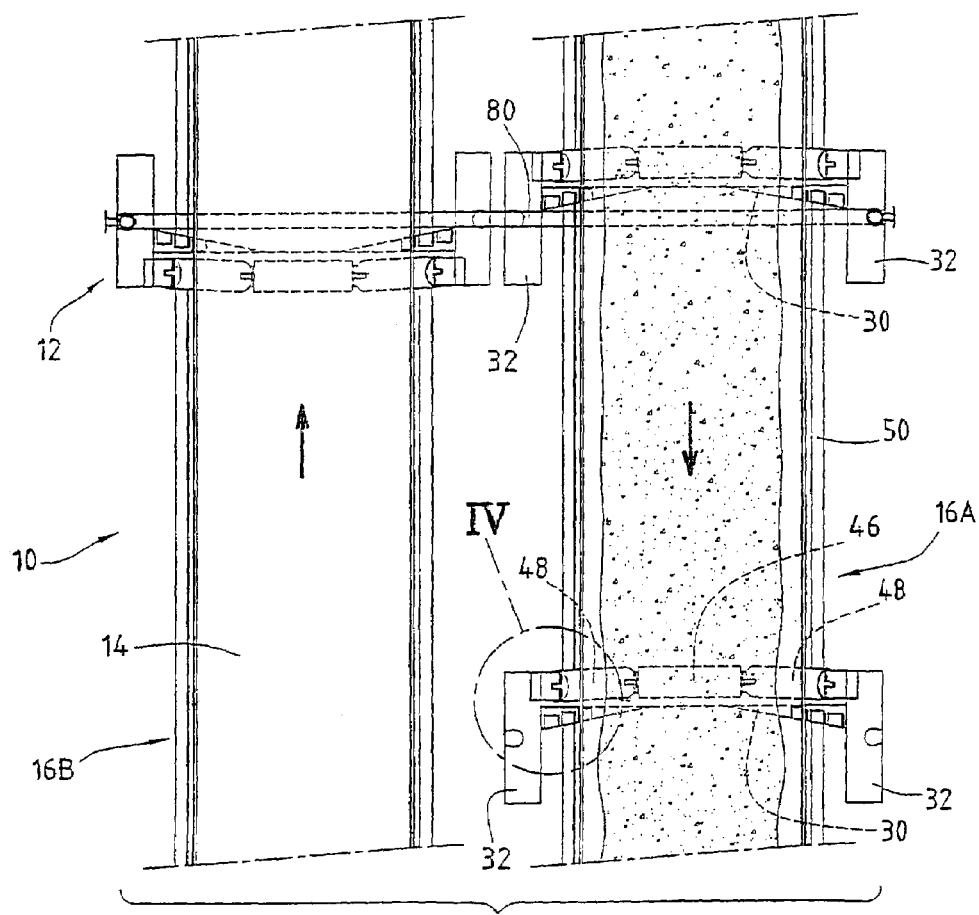
FIG. 1 is a fragmentary plan view of a conveyor of the invention.
Figure 2:
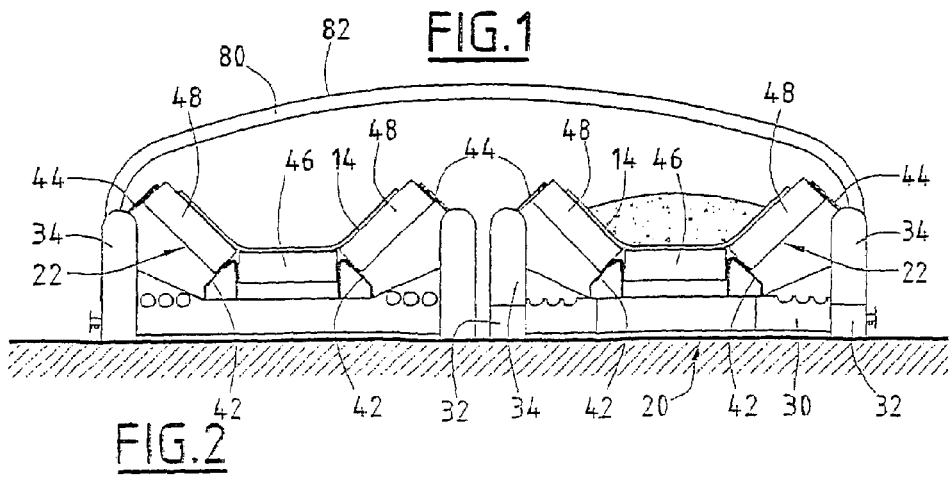
FIG. 2 is a cross-section view of the FIG. 1 conveyor.

The conveyor 10 shown in the figures comprises a set of support stations 12 and a conveyor belt 14 traveling over the support stations 12. The belt forms a closed loop and it is held between two end rollers (not shown) in conventional manner. One of the rollers is motor driven to cause the belt to travel over the rollers as a transport segment 16A and as a return segment 16B, in which segments the belt travels in opposite directions.

The support stations are disposed one after another along each of the segments of the conveyor. The stations are all identical. They are spaced apart at intervals lying in the range 500 centimeters (cm) to 3000 cm for the transport segment and they are spaced apart at longer intervals lying in the range 1500 cm to 9000 cm for the return segment 16B. Material can also be conveyed by the belt in its return segment.

The support stations are placed directly on the ground without being anchored thereto, e.g. on a concrete slab.

Each support station comprises a base 20 suitable for resting on the ground and a cradle 22 for guiding the belt carried by the base.

According to the invention, the base 20 is made up of at least one beam made of concrete supporting the cradle for guiding the belt.

More precisely, in the embodiment shown in the figures, the base 20 comprises a transverse main beam 30 extended at each end by respective arms 32 bearing against the ground and extending to the same side of the beam 30, each being disposed perpendicularly to the beam. The length of the arms lies in the range one-fourth to one-half the length of the main beam. The length of the main beam lies in the range 1 meter (m) to 2 m.

In addition, the base 20 has two columns 34 likewise made of concrete and extending perpendicularly to the plane defined by the main beam and the two arms 32. The columns 34 extend parallel to each other and are of substantially the same length as the bearing arms 32.

The total weight of the base preferably lies in the range 20 kilograms (kg) to 200 kg.

The guide cradle 22 comprises a set of roller support tabs made of metal plates, each having at least one end embedded in the base-constituting concrete. Thus, for example, two intermediate tabs 42 are embedded in the main beam 30, and two end tabs 44 are embedded in the tops of the columns 34. A generally horizontal bottom roller 46 and two inclined side rollers 48 are mounted free to rotate between the support tabs. These rollers occupy a common, generally-vertical plane and they are suitable for receiving the belt and for deforming it so as to impart a trough-shape thereto.

Furthermore, in order to ensure that the successive stations are properly positioned relative to one another, the conveyor has spacers 50 constituted by rectilinear metal tubes of predetermined length. Each tube is engaged at one end in a blind hole formed in the thickness of the base and opening out sideways.

More precisely, and as shown in FIG. 4, on both sides of its longitudinal mid-axis, each base has three blind holes 60 of the same depth opening out in a front plane face 62 of the beam of the base.

In its rear face 70, opposite from its front face, each main beam 30 includes, on either side of its longitudinal mid-axis, three blind holes 72, 74, 76 in alignment in a horizontal plane. The ends of the holes 72, 74, 76 are situated at different levels along the longitudinal mid-axis of the support stations.

Two spacers 50 are interposed between each successive pair of stations, the ends of the spacers being placed in the facing blind holes. If the spacers are placed in blind holes in a given base with ends that lie in the same plane, then the two successive stations are accurately parallel to each other. In contrast, if the ends of the spacers are placed in holes in a given base having ends that are at different levels, the successive stations are angularly offset relative to each other by an angle corresponding to the angle of inclination imposed by the offset between the positions of the ends of the blind holes in which the spacers are inserted.

Finally, the conveyor advantageously includes a roof constituted by a succession of arches 80 disposed transversely and supported by the stations, together with a tarpaulin 82 carried by the arches 80.

Preferably, each base 20 has a hole formed in the middle portion of each bearing arm 32 so as to receive the ends of the arches.

The arches are placed astride simultaneously both over the transport segment and over the return segment of the conveyor.

It can be understood that with such a conveyor, each station is made very easily by injecting concrete into a mold and simultaneously embedding tabs that are suitable for holding the support rollers.

The beams are dimensioned in such a way that the total weight of the base is sufficient to enable the station to be kept stationary merely by its own weight when it is placed on the ground.

Since the cost of concrete is very low, the overall cost of each station is low.

Insofar as no special means are implemented for securing the support stations to the ground, the use of such a conveyor is of very low cost, since stations can easily be moved without it being necessary to remove ballast or anchoring means in the ground.

Furthermore, the use of spacers all having the same length and positioned in blind holes whose ends are at distinct positions, makes it possible to achieve angular positioning of the stations relative to one another in very simple manner.

The invention claimed is:

1. A conveyor comprising a set of support stations disposed in succession and a conveyor belt forming a closed loop and suitable for traveling over the support stations along a transport segment and a return segment, the support stations comprising a base for bearing against the ground and a cradle for guiding the belt and supported by the base, wherein the base comprises at least one concrete beam, the support stations along the transport segment of the conveyor belt, being distinct from the support stations along the return segment of the conveyor belt, the transport and the return segment having each a respective set of support stations, each support station having its own base for bearing against the ground and its own cradle for guiding the belt.

2. A conveyor according to claim 1, wherein the base comprises a transverse concrete beam extended at each end by a respective side arm extending generally transversely to the main beam.

3. A conveyor according to claim 1, wherein the base comprises a transverse main beam of concrete extended at each end by a respective concrete column supporting the belt-guide cradle.

4. A conveyor according to claim 1, wherein the belt-guide cradle includes tabs embedded directly in the concrete of the base.

5. A conveyor according to claim 1, wherein the base includes sets of blind holes laterally on either side, the holes opening out laterally and having ends that extend to different levels along the longitudinal axis of the station.

6. A conveyor according to claim 1, wherein the conveyor has spaces interposed between two successive support stations and suitable for being engaged selectively in one or the other of the blind holes whose ends extend to different levels.

7. A conveyor according to claim 1, wherein the support stations are free with respect to the ground and are not anchored to the ground.

8. A support station for a conveyor belt, the station comprising a base for bearing against the ground and a cradle for guiding the belt and supported by the base, wherein the base comprises at least one concrete beam, wherein the base includes sets of blind holes laterally on either side, the holes opening out laterally and having ends that extend to different levels along the longitudinal axis of the station.

\* \* \* \* \*